W. C. TILTON.
Cotton-Choppers.
No. 138,596. Patented May 6, 1873.
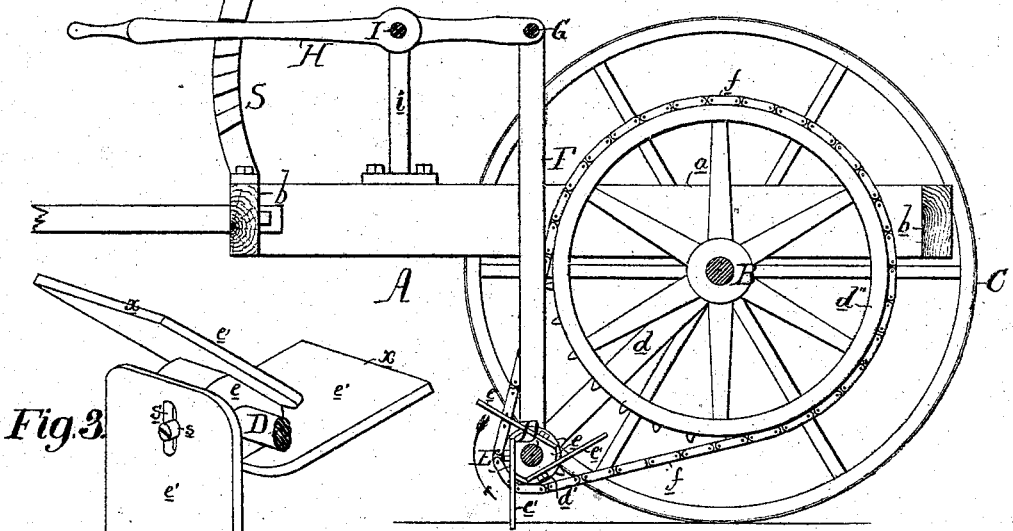
Fig. 1.
Fig. 3.
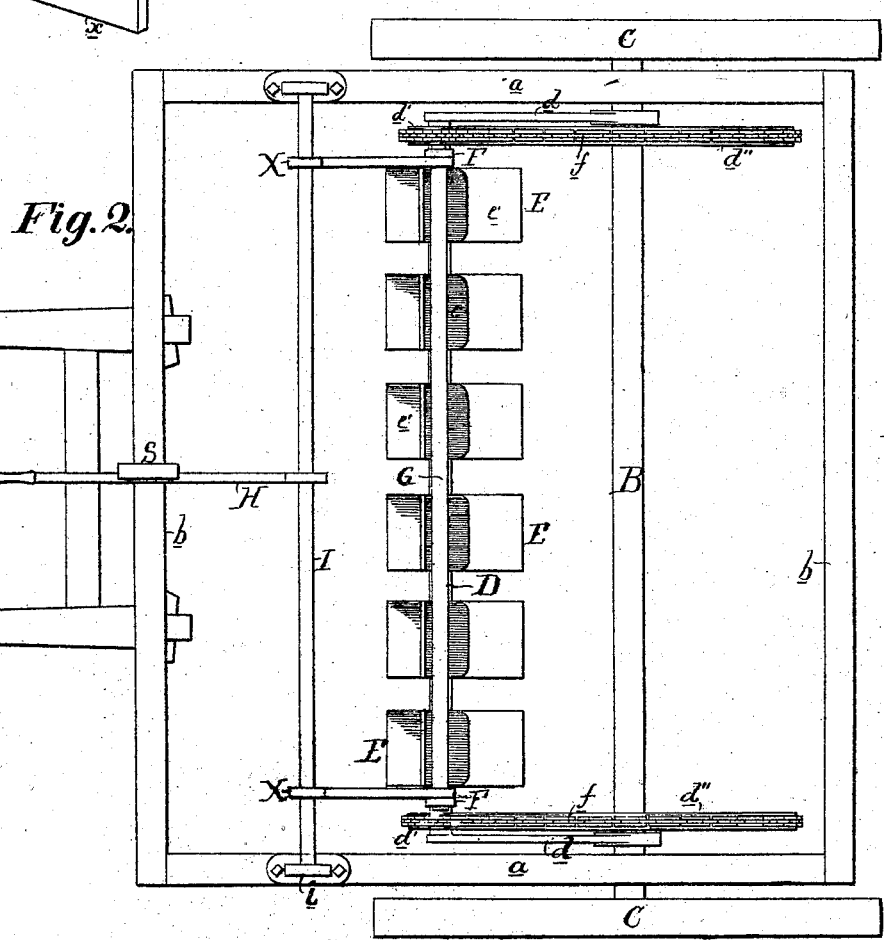
Fig. 2.
Witnesses: Wm. A. Steel, Thos. McLain.
W. C. Tilton
by his Attys
Howson and Son

UNITED STATES PATENT OFFICE.

WILLIAM C. TILTON, OF SPRING PLACE, GEORGIA, ASSIGNOR TO HIMSELF AND HENRY DISSTON AND SON, OF PHILADELPHIA, PENNSYLVANIA.

IMPROVEMENT IN COTTON-CHOPPERS.

Specification forming part of Letters Patent No. 138,596, dated May 6, 1873; application filed November 19, 1870.

*To all whom it may concern:*

Be it known that I, WILLIAM CAPERS TILTON, of Spring Place, county of Murray, State of Georgia, have invented an Improved Machine for the Cultivation of Cotton, of which the following is a specification:

Nature and Object of the Invention.

My invention consists of an implement too fully described hereafter to need preliminary explanation, by the aid of which portions of the rows of growing cotton-stalks may be cut or chopped away, leaving at intervals the desired quantity of growing stalks, an operation which has heretofore been always accomplished by hand labor.

Description of the Accompanying Drawing.

Figure 1 is a sectional elevation of my improved machine for the cultivation of cotton; Fig. 2, a plan view of the same; and Fig. 3, a perspective view of one of the "cutters."

General Description.

In the cultivation of cotton it is customary to plant the seed by means of a drill in such a manner that the plant grows up in long continuous rows. Instead of allowing the plants to continue to grow in this way it is necessary for their proper cultivation to thin out by cutting or chopping away so much of the growing stalks and in such a manner as to leave bunches or hills about from six to twelve inches apart, according to the judgment of the planter. In machines hitherto employed for this purpose the unnecessary plants have been dug out, the removal of the earth consuming a considerable portion of the power of the machine.

The frame A of the machine consists of longitudinal beams $a\ a$ and transverse beams $b\ b$ supported on an axle, B, the latter having at its outer ends wheels C C, by means of which the implement is moved over the ground. A shaft, D, is hung to the axle by means of arms $d\ d$, and to this shaft are attached any desired number of cutters or choppers E. These cutters or choppers form the most important feature of my invention, and each consists of a triangular block, $e$, secured to the shaft D. To each of the three sides of the block $e$ a hoe-shaped plate, $e'$, having cutting-edges $x$, is secured by a set-screw, $s$, passing through an elongated slot, $s'$, in the plates, so that the latter can be adjusted nearer to or further from the shaft to which the cutters are attached, as circumstances may require, and secured after adjustment.

Any desired number of the choppers E may be attached at regular intervals to the shaft D, at the opposite ends of which are secured small chain-wheels $d^1$, to which motion is imparted from the larger chain-wheels $d^2$ through the medium of the chains $f$, so that on drawing the machine over the ground the cutters will revolve in the direction pointed out by the arrow.

I do not desire, however, to limit myself to any specific mechanism for communicating motion from the driving-wheels to the chopper-shaft, as different systems of gearing may be adopted for that purpose.

Two rods, F F, are connected at their lower ends to the shaft D, one near each end of the latter, the upper ends of the rods being jointed to arms X X on a shaft, I, which is adapted to bearings $i$ on the frame of the machine, and this shaft has a lever, H, adapted to notches in the curved bar S at the front of the implement.

The above-described machine is intended to be drawn across the continuous rows of the growing cotton-stalks for the purpose of thinning out the greater portion of the same by means of the cutters E, and by the proper adjustment of the latter to cause the remaining stalks to grow at regular intervals apart. The extent of these distances the planter determines upon before commencing the operation, and adjusts the cutters so as to cut away the desired quantities of the stalks at the proper points, leaving other stalks, which escape the action of the cutters, to grow in hills or clumps at the proper distance apart. The cutters may be adjusted in various ways, according to the judgment of the planter. All of the cutters may be brought together on the shaft when it is desired to chop out of the row of stalks a quantity equal to the combined width of the cutters; or the cutters may be arranged in pairs with regular spaces between them; or, when necessary, different sizes of the detachable plates $e'$ may be employed. The wheels C C, as the implement is drawn across the rows, impart their motion, through the wheels $d^2$ and chains $f$, to the shaft D; the cutters E on the latter being thus caused to revolve rapidly with the shaft, their cutting-edges will strike and penetrate the ground to the distance of about half an inch, chopping the stalks off close to the surface of the ground.

By operating the lever H the shaft D with the cutters E may be raised so as to accommodate the latter to any inequalities of the ground over which they pass, and on approaching a stump or other obstruction, so as to clear the same, and may be maintained in an elevated position by inserting the lever in any of the notches in the curved arm S until the obstruction has been passed, when the lever is released and the cutters lowered to their original position.

Claim.

The combination of the driving-wheels $a^2$, bands or chains $f$, the revolving adjustable cutters, and adjusting-lever H, substantially as described.

In testimony whereof I have signed my name to this specification in the presence of two subscribing witnesses.

WILLIAM C. TILTON.

Witnesses:
  WM. J. WONHAM,
  W. W. OATES.